United States Patent
Barreiro

(10) Patent No.: US 7,468,738 B2
(45) Date of Patent: Dec. 23, 2008

(54) METHOD AND SYSTEM OF MULTILOCATION VIDEO CONFERENCING

(75) Inventor: Giovanna Barreiro, Austin, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 734 days.

(21) Appl. No.: 11/116,054

(22) Filed: Apr. 27, 2005

(65) Prior Publication Data

US 2006/0244815 A1    Nov. 2, 2006

(51) Int. Cl.
*H04N 7/14* (2006.01)
*G09B 19/00* (2006.01)

(52) U.S. Cl. ............... 348/14.07; 348/14.08; 348/14.09

(58) Field of Classification Search ... 348/14.01–14.09, 348/14.1, 14.11–14.16, 154; 370/260, 261; 434/308, 324
See application file for complete search history.

(56) References Cited

U.S. PATENT DOCUMENTS

| | | | |
|---|---|---|---|
| 5,548,324 A | | 8/1996 | Downs et al. |
| 5,625,410 A | * | 4/1997 | Washino et al. ............. 348/154 |
| 5,745,161 A | * | 4/1998 | Ito ........................... 348/14.09 |
| 5,786,746 A | * | 7/1998 | Lombardo et al. ..... 340/286.07 |
| 5,963,246 A | * | 10/1999 | Kato ....................... 348/14.09 |
| 6,124,881 A | | 9/2000 | Terui et al. |
| 6,233,428 B1 | | 5/2001 | Fryer |
| 6,441,841 B1 | | 8/2002 | Tanoi |
| 6,515,695 B1 | * | 2/2003 | Sato et al. ................ 348/14.08 |
| 2001/0053132 A1 | * | 12/2001 | Attimont et al. ............ 370/260 |
| 2003/0023742 A1 | | 1/2003 | Allen et al. |
| 2003/0142200 A1 | | 7/2003 | Canova, Jr. et al. |
| 2004/0066456 A1 | | 4/2004 | Read |
| 2004/0091086 A1 | * | 5/2004 | Ortel ....................... 379/88.02 |
| 2004/0119814 A1 | | 6/2004 | Clisham et al. |
| 2004/0148635 A1 | | 7/2004 | Merchant |
| 2004/0201710 A1 | * | 10/2004 | Uchihashi et al. ......... 348/211.2 |
| 2006/0077253 A1 | * | 4/2006 | VanRiper et al. ............ 348/143 |

* cited by examiner

*Primary Examiner*—Melur Ramakrishnaiah
(74) *Attorney, Agent, or Firm*—Brooks Kushman P.C.

(57) ABSTRACT

A method and system of video conferencing. The video conferencing generally relates to supporting video and/or audio conferencing between remotely located individuals. The method and system permit multiple individuals at one location to be viewed from one or more locations located remotely therefrom.

19 Claims, 2 Drawing Sheets

METHOD AND SYSTEM OF MULTILOCATION VIDEO CONFERENCING

BACKGROUND OF THE INVENTION

1. Field of the Invention

The present invention relates to methods and systems of video conferencing between individuals located at remote locations.

2. Background Art

Many childcare/after school facilities are implementing a system to let parents watch their children over a secure internet connection. The typical solution consists of one camera per classroom/play area. This camera may be strategically located so the whole class is recorded at all times. Accounts are assigned to the parents which allows the parents to login from a computer and watch a live video of their children's class at any time during the centers hours of operation.

One problem with this system is that operation is limited to one-way communications in that the parents can see their children but the children cannot see their parents. Another problem is that there is no audio communication with the parents such that the parents may only see, and not hear, their children.

Enterprise video conferencing employs a similar system to support two-way video conferencing but it too is problematic in that it is limited to one-to-many communications, i.e., everyone sees the same images and the participants are unable to separately communicate with each other.

DETAILED DESCRIPTION OF THE PREFERRED EMBODIMENT(S)

Figure 1:
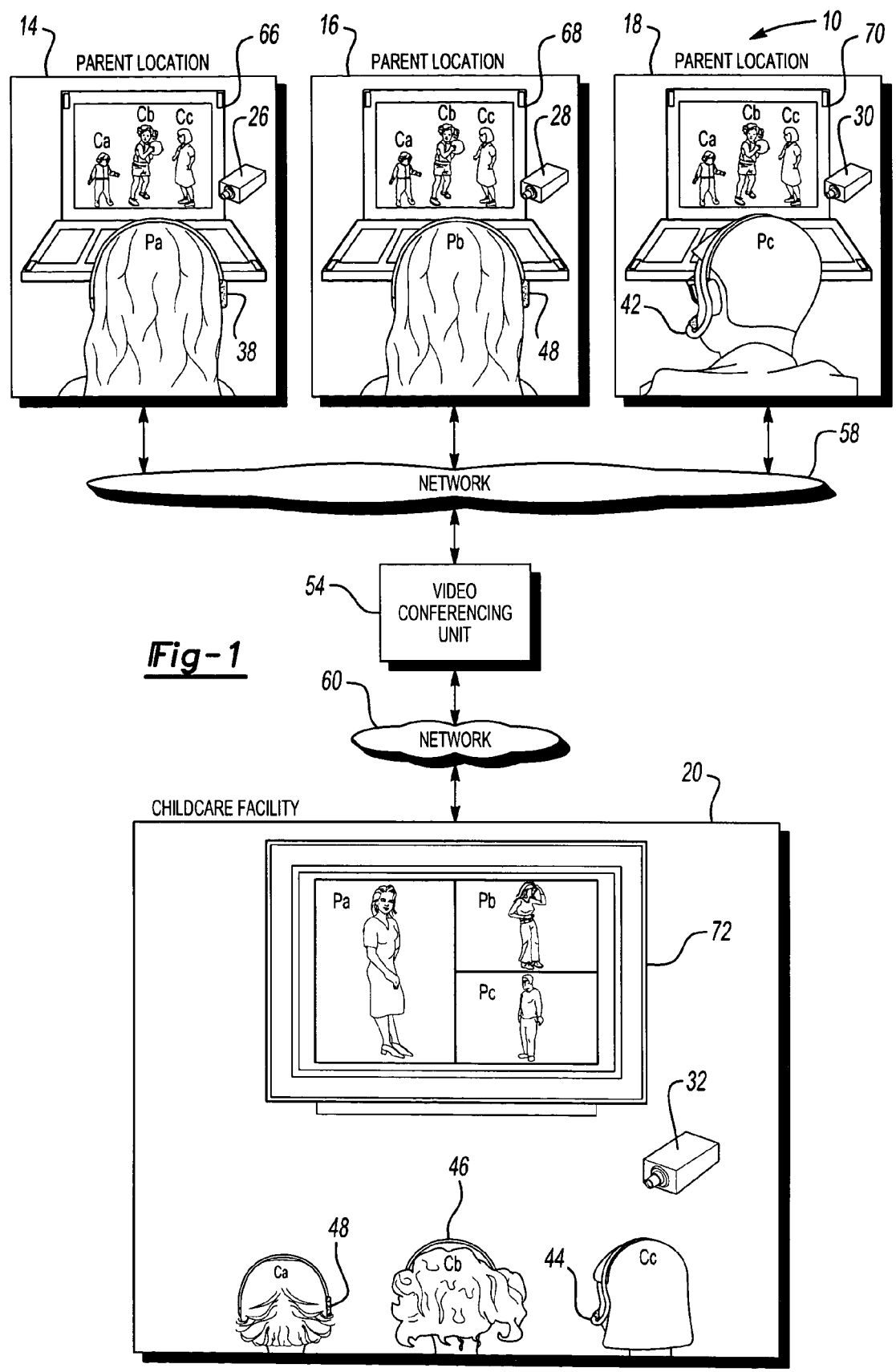
FIG. 1 illustrates a system of providing video conferencing in accordance with one non-limiting aspect of the present invention.

One non-limiting aspect of the present invention relates to a system which allows video conferencing and overcomes the above-identified deficiencies. The system may allow multiple users to be logged into the same account from separate locations. The system may allow multiple participants to view each other. The multiple participants may also separately communicate with each other, including when video of other participants is displayed on a common display.

One non-limiting aspect of the present invention relates to a system of allowing parents to video conference with their children when the children are at a childcare facility and the parents are located at other remote locations. The system may include a video conferencing unit, one or more childcare video cameras, and one or more parent video cameras. The childcare video cameras may be configured to record video from at least one room in the childcare facility and to transport the recorded video to the video conferencing unit. The parent video cameras may be configured to record video of the parents and to transport the recorded video to the video conferencing unit. The video conferencing unit may be accessible through a network and configured to output signals for displaying video from one or more of the parents on a childcare display located at the childcare facility so that the displayed parents are simultaneously visible on the childcare display for viewing by their children and to output signals for displaying video from one or more of the one or more childcare video cameras on the parent displays of each active parent so that the children are visible on the parent displays.

The system may include a number of audio communicators configured to support audio communications between one or more parents and one or more children. The video conferencing unit may be configured to support separate audio communications between the parents and children so that parents can communicate with their children without other children and parents hearing the audio associated therewith.

The system may include a number of identification units. The identification units may be associated with one or more children and configured to assist in tracking the children within the childcare facility, such as to facilitate video recording of the tracked children. The video conferencing unit may be configured to control operation of one or more of the childcare monitors as a function of one or more identification units so as to facilitate continuous video recording of one or more children.

One non-limiting aspect of the present invention relates to a method of video conferencing between a central office and multiple satellite offices. The satellite offices may be located remotely from the central office. The method may include recording video from at least one central office, the central office may include a number of individuals such that multiple individuals are recorded. The method may further include recording video from at least one satellite office, the satellite offices may include at least one individual such that video from each satellite office includes at least one individual. The method may further include determining one or more active satellite offices, the active satellite offices may be those desiring to video conference with the central office. The method may further include displaying video from one or more of the active satellite offices on a common central office display so that the individuals associated therewith are simultaneously displayed on the common display so that the multiple central office individuals may view multiple individuals from different satellite offices, and displaying video from the central office at each active satellite office so that each satellite office includes video of the multiple individuals at the central office.

The above features and advantages, along with other features and advantages of the present invention, are readily apparent from the following detailed description of the invention when taken in connection with the accompanying drawings.

FIG. 1 illustrates a system 10 of providing video conferencing in accordance with one non-limiting aspect of the present invention. The system 10 relates to providing video and audio communications between multiple locations 14-20. For exemplary purposes, the operation of the system 10 is described with respect to a childcare environment where parents video conference with their children at a childcare location 20 from a number of remote locations 14-18.

This exemplary description, however, is not intended to limit the scope of the present invention. Rather, the present invention fully contemplates any number of environments and supporting video conferencing between any number of locations, and not necessarily between individuals having a parent-child relationship, such as between one or more satellite offices and a central office.

Each of the parent locations 14-18 and the childcare facility 20 may include one or more video cameras 26-32 and one or more audio communicators 38-48. The video cameras 26-32 may be configured to record video and to transport the recorded video to a video conferencing unit 54. The audio communicators 38-48 may be configured to record audio and to transport the recorded audio to the video conferencing unit 54.

The devices at the parent locations 14-18 and childcare facility 20 may communicate with the video conferencing unit 54 over one or more networks 58-60. The networks may be wireline and/or wireless networks which transport electrical signals according to any number of protocols and standards. The present invention contemplates any number of transmission mediums and configurations for supporting electrical transmissions and is not intended to be limited to any particular configuration.

The video conferencing unit 54 may be a standalone feature located remotely from the parent locations 14-18 and childcare facility 20 and/or the functionality associated therewith may be an integrated into one of the items located at the parent locations 14-18 and childcare facility 20. The video conferencing unit 54 may be an application, program, server, processor, or other feature configured to perform operations in accordance with the present invention. As such, the present invention is not intended to be limited to any particular configuration for the video conferencing unit 54 and fully contemplates the use of any number of features, devices, and programs to support the functionality associated therewith.

Each of the parent locations 14-18 and childcare facility 20 may include a monitor, display, television, computer, or other device 66-72 for displaying the recorded video and playing the recorded audio. The video conferencing unit 54 may be configured to output signals for displaying video recorded by the one or more parent video cameras 26-30 on a common display 72 located at the childcare facility. The video conferencing unit 54 may be configured to simultaneously display video for each active parent on the common display 72 so that each active parent is viewable within at least a portion of the common display 72.

The video conferencing unit may host a webpage or perform other operations to facilitate viewing the video at the childcare facility 20. The webpage may be accessed, such as after a login process, to view the video and to facilitate determining the active parents. The active parents may be generally characterized as those parents desiring to view video and/or to listen to audio from the childcare facility. As shown in FIG. 1, three parents, labeled PA-PC, are active and shown in the common display 72 while each child, labeled CA-CC, may view the common display 72 to view their parents. Of course, other children of non-active parents may view the active parents and other personnel, such as childcare facility providers, may also view the active parents.

The video conferencing unit 54 may be configured to output signals from one or more of the childcare video camera(s) 32 to displays, monitors, televisions, or other devices at the parent locations, which for exemplary purposes are shown as computer terminals 66-70. The video conferencing unit 54 may host a webpage or perform other operations to facilitate displaying the video at the parent locations 14-18.

The video conferencing unit 54 may include a login process or other authorizing application to insure only authorized parents are receiving video and to insure only authorized parents are displaying video at the childcare facility 20. As shown, video from a common room, childcare video camera 32 may be commonly outputted to the parent locations 14-18. The room may be associated with a playroom or other general congregational room at the childcare facility 20.

The childcare facility 20 may include any number of video cameras within any number of rooms or locations at the childcare facility 20 which may record video for display at the parent locations 14-18. Optionally, multiple childcare cameras may be leveraged off of to display more than one video at the parent locations 14-18, such as through picture-in-picture applications or split-screen viewing applications. The video conferencing unit 54 may also be configured to distribute video recorded at the parent locations 14-18 so that the parents may view their children and the other parents in a split-screen.

The video conferencing unit 54 may be configured to provide separate channels or other communications mediums between the audio communicators 38-42 located at the parent locations 14-18 and the audio communicators 44-48 located at the childcare facility 20. Such audio communication may operate simultaneously with the above-described video so as to permit the parent locations to individually communicate with one or more children and/or one or more childcare facility providers.

The audio communications may be separate in that the communications on each channel are separately distinguished from the other audio communications so that other individuals are prevented from listening to the audio communications. The parents may communicate with their children without other individuals hearing the audio. In this manner, common video may be used by multiple individuals while dedicated or separate audio communications are established between various individuals.

The video conferencing unit 54 may be configured to support broadcast operations. The broadcast operations may allow parents, children, or childcare providers to interrupt the separate audio communications in order to deliver a broadcast communication to each individual. For example, this functionality may be used by one of the providers to broadcast an audio message or otherwise simultaneously communicate to each of the parents, such as to support a conference call. Furthermore, messages may be recorded or otherwise stored for messaging with non-active parents in a similar fashion.

The video conferencing unit 54 may be configured to control operation of the childcare and parent video cameras 26-32. The control may include selectively determining which one or more cameras are active, areas recorded by the cameras (i.e., by control a direction or pointing of the cameras), zooming features of the cameras, and other features of camera operation. Optionally, the video conferencing unit 54 may receive requests or commands from the parent locations 14-18 for controlling one or more of the childcare cameras, such as to permit parents to maneuver the childcare camera(s) 32 in order to locate their children within the childcare facility 20. If the childcare facility 20 includes multiple cameras, then various parents may simultaneously control different cameras, such as to locate their respective children.

The video conferencing unit 54 may be configured with rules and regulations for governing video and audio communications. The rules and regulations may limit operation and control of any one of the devices in the system 10 according to any number of rules and regulations. For example, operation and control of the childcare video camera(s) 32 may be limited to certain periods of the day, to limited number of parents, i.e., based on subscription status or other parameters, and/or to certain locations within the childcare facility, i.e. to provide privacy in certain portions of the facility.

Figure 2:
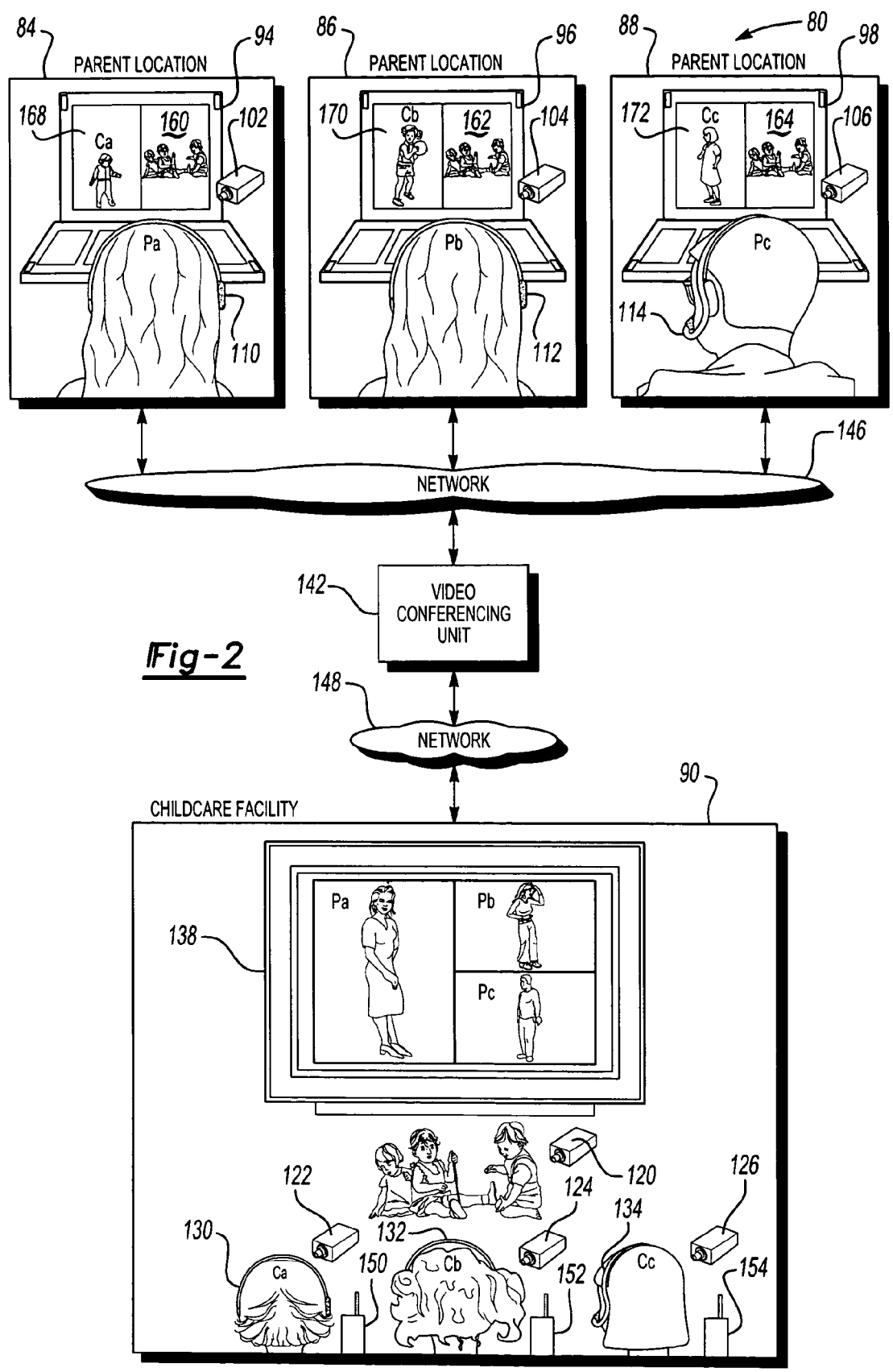
FIG. 2 illustrates a multi-camera system for supporting video conferencing in accordance with one non-limiting aspect of the present invention.

FIG. 2 illustrates a multi-camera system 80 for supporting video conferencing in accordance with one non-limiting aspect of the present invention. The system 80 is described with continued reference to the exemplary parent-child example where parents desire to video conference with their children from remote locations while the children are at a childcare facility.

The system may include a number of parent locations 84-88 and a childcare facility 90. The parent locations 84-88 may include displays 94-98, video cameras 102-106, and audio communicators 110-114. The childcare location 90 may include cameras 120-126, audio communicators 130-134, and one or more displays 138. Each of these devices may be configured to communicate with a video conferencing unit 142 over one or more networks 146-148 and/or other features may be provided at each location 84-90 to facilitate operations similar to those describe above with respect to FIG. 1.

The video conferencing unit 142 may be configured to output signals for displaying video recorded by the one or more parent video cameras 102-106 on a common display 138 located at the childcare facility 90. The video conferencing unit 142 may be configured to simultaneously display video for each active parent on the common display so that each active parent is viewable within at least a portion of the common display 138.

Each of the children may include an identification unit 150-154. The identification units 150-154 may be a wireless transmitter or other unit which communicates with the video conferencing unit 142 and/or another feature at the childcare facility 90. The video conferencing unit 142 may be configured to identify a location, image, or other identifying characteristics of the children as a function of their identification units 150-154. The video conferencing unit 142 may then use this information to associate each identified child with recorded video.

The childcare facility 90 may include a number of cameras 120-126 in different rooms or areas of the childcare facility 90. Each of the cameras 120-126 may record fixed portions of the childcare facility 90 and/or they may be controlled by the video conferencing unit 142 or the parents to record variable portions of the childcare facility 90. The video conferencing unit 142 may track the video recording as a function of the children associated therewith. For example, the identification units 150-154 may be used to locate children within the childcare facility 90 and to cross-reference their locations with one or more cameras 120-126 which may be recording that area. This may be repeated for each identification unit 150-154 to facilitate associating the children with the recorded video.

The video conferencing unit 142 may be configured to determine which video from the one or more childcare video cameras 120-126 is associated with each child so that video displayed on the parent displays 94-98 includes video of the child associated with the viewing parent. As shown, each parent, labeled PA-PC, may view images of their children, labeled CA-CC, on their respective displays 94-98. This video may change to video from other cameras 120-126 as the children move throughout the childcare facility so that each parent may constantly view their child.

In some cases, different parents may view video from the same camera 120-126 if their children are being recorded by the same camera 120-126. Optionally, if multiple cameras 120-126 are recording the same child, the parent may selectively control which video is displayed or selectively control split screen viewing to view two or more of the videos. The parent locations 84-8 may also view other video from the childcare facility 90, which may or may not include their children. As shown, each parent display includes a portion 160-164 showing video from a common video camera 120 and a portion 168-172 showing video from a camera associated with their child.

The present invention contemplates any number of applications, environments, and configurations which leverage off of the functionality described above with respect to FIGS. 1 and 2. The present invention fully contemplates other applications which are not dependent on parent-child relationships. The exemplary parent-child descriptions is only provided to describe one example where individuals may desire to communicate over common video while simultaneously communicating over separate audio channels.

This arrangement, however, would apply equally to other industries and other enterprise level solutions where it may be desirable for multiple individuals to video conference. For example, on such analogy may be made for manufacturing plant and controller applications wherein the manufacturing plant is similar to the childcare facility (central office) and the controllers or program managers are the parents (satellite office). As such, for the purposes of the present invention, the usage of parent, child, and childcare facility is not intended to limit the scope and contemplation of the present invention and is not intended to limit its application to any patriarchal relationship or to only childcare environments.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of allowing parents to video conference with their children when the children are at a childcare facility and the parents are at other remote locations, wherein one parent of a child at the childcare facility is at a first one of the remote locations and the other parent of the child is at a second one of the remote locations, the method comprising:
    receiving, by a video conferencing unit via a first network, videos of the children recorded by childcare video cameras at the childcare facility;
    receiving, by the video conferencing unit via a second network, videos of the parents recorded by parent video cameras respectively located at the remote locations;
    outputting the videos of the parents from the video conferencing unit on a childcare display at the childcare facility via the first network so that the parents are displayed on respective portions of a childcare display at the childcare facility for viewing by the children;
    outputting one of the videos of the children from the video conferencing unit to parent displays respectively at the remote locations via the second network so that the children are displayed on one portion of each parent display for viewing by the parents;
    outputting the video of the one parent from the video conferencing unit to the parent display at the second one of the remote locations via the second network such that the one parent is displayed on another portion of the parent display at the second one of the remote locations for viewing by the other parent; and
    outputting the video of the other parent from the video conferencing unit to the parent display at the first one of the remote locations via the second network such that the other parent is displayed on another portion of the parent display at the first one of the remote locations for viewing by the one parent.

2. The method of claim 1 further comprising:
    selectively controlling by the video conferencing unit which video from the childcare video cameras is displayed on the parent displays.

3. The method of claim 2 further comprising:
permitting the parents by the video conferencing unit to selectively determine which video from the childcare video cameras is displayed on the parent displays.

4. The method of claim 3 further comprising:
remotely controlling by the video conferencing unit the childcare cameras and allowing the parents by the video conferencing unit to selectively control operation of the childcare video cameras selected by the parents.

5. The method of claim 2 further comprising:
including an identification unit on one or more of the children and configuring the video conferencing unit to associate children with video from the childcare video cameras as a function of the identification units, and determining by the video conferencing unit which video from the childcare video cameras is associated with each child so that video displayed on the parent displays includes video of the child associated with the parent viewing the parent display.

6. The method of claim 1 further comprising:
receiving by the video conferencing unit audio recorded by audio communicators associated with the children and their parents, and selectively communicating by the video conferencing unit the audio between the parents and the children.

7. The method of claim 6 wherein the video conferencing unit communicates the audio so that parents communicate with their children without the other children and parents hearing the audio associated therewith.

8. The method of claim 6 further comprising:
permitting one or more parents or one or more providers at the childcare facility by the video conferencing unit to interrupt video and/or audio communicated to the other parents so as to permit the interrupting parent or provider to broadcast video and/or audio to the interrupted parents.

9. The method of claim 1 further comprising:
limiting by the video conferencing unit video recorded by the childcare video cameras and video displayed by the childcare display as a function of predefined rules of operation.

10. The method of claim 1 further comprising:
allowing the parents by the video conferencing unit to selectively determine whether their video is displayed on the childcare display.

11. A system of allowing parents to video conference with their children when the children are at a childcare facility and the parents are at other remote locations, wherein one parent of a child at the childcare facility is at a first one of the remote locations and the other parent of the child is at a second one of the remote locations, the system comprising:
a video conferencing unit for receiving and outputting videos;
at least one childcare video camera at the childcare facility to record a video of the children and to transport the video of the children to the video conferencing unit via a first network;
a childcare display at the childcare facility;
parent video cameras respectively at the remote locations to record videos of the parents and to transport the videos to the video conferencing unit via a second network; and
parent displays respectively at the remote locations;
wherein the video conferencing unit outputs the videos of the parents on the childcare display via the first network such that the parents are displayed on respective portions of the childcare display for viewing by the children;
wherein the video conferencing unit outputs the video of the children to the parent displays via the second network such that the children are displayed on one portion of each parent display for viewing by the parents;
wherein the video conferencing unit outputs the video of the one parent to the parent display at the second one of the remote locations via the second network such that the one parent is displayed on another portion of the parent display at the second one of the remote locations for viewing by the other parent;
wherein the video conferencing unit outputs the video of the other parent to the parent display at the first one of the remote locations via the second network such that the other parent is displayed on another portion of the parent display at the first one of the remote locations for viewing by the one parent.

12. The system of claim 11 further comprising:
audio communicators configured to support audio communications between one or more parents and one or more children.

13. The system of claim 12 wherein the video conferencing unit supports separate audio communications between the parents and children so that parents can communicate with their children without other children and parents hearing the audio associated therewith.

14. The system of claim 11 further comprising:
identification units associated with one or more children for tracking the children within the childcare facility and to facilitate tracking video recording of the children.

15. The system of claim 14 wherein the video conferencing unit controls operation of one or more of the childcare video cameras as a function of one or more identification units so as to facilitate continuous video recording of one or more children.

16. A system of allowing parents to video conference with their children when the children are at a childcare facility and the parents are at other remote locations, wherein one parent of a child at the childcare facility is at a first one of the remote locations and the other parent of the child is at a second one of the remote locations, the system comprising:
a video conferencing unit;
a video camera at the childcare facility to provide a video of the children to the video conferencing unit;
an audio communicator associated with the child to provide audio communications of the child to the video conferencing unit and to receive audio communications from the video conferencing unit for the child to hear; and
a childcare display at the childcare facility;
video cameras respectively at the remote locations to provide videos and audio communications of the parents to the video conferencing unit;
parent displays respectively at the remote locations;
wherein the video conferencing unit outputs the videos of the parents to the childcare display such that the parents are displayed on respective portions of the childcare display for viewing by the children, outputs the video of the children to the parent displays such that the children are displayed on a portion of each parent display for viewing by the parents, outputs the video of the one parent to the parent display of the other parent such that the one parent is displayed on another portion of the parent display of the other parent for viewing by the other parent, and outputs the video of the other parent to the parent display of the one parent such that the other parent is displayed on another portion of the parent display of the one parent for viewing by the one parent;

wherein the video conferencing unit further outputs the audio communications of the child to the first and second remote locations for the parents of the child to hear and outputs the audio communications of the parents of the child to the audio communicator for the child to hear.

17. The system of claim 16 further comprising:

an identification unit associated with the child;

wherein the video conferencing unit is operable with the identification unit to determine the location of the child in the childcare facility and is operable to control the video camera at the childcare facility to provide the video of the children to the video conferencing unit based on the location of the child.

18. The system of claim 16 further comprising:

an identification unit associated with the child; and a second video camera at the childcare facility to provide a video of the children to the video conferencing unit;

wherein the video conferencing unit is operable with the identification unit to determine the location of the child in the childcare facility;

wherein the video conferencing unit controls the second video camera at the childcare facility to provide a video of the child to the video conferencing unit and outputs the video of the child to the parent display of at least one parent of the child such that the child is displayed on a portion of the parent display of the at least one parent for the at least one parent to view.

19. The system of claim 16 further comprising:

a plurality of audio communicators respectively associated with at least some of the other children to provide audio communications of the associated children to the video conferencing unit and to receive audio communications from the video conferencing unit for the associated children to hear;

wherein the video conferencing unit respectively outputs the audio communications of the at least some of the other children to the remote locations for the parents of these children to hear and respectively outputs the audio communications of these parents to the audio communicators associated with their children for their children to hear.

* * * * *